United States Patent
Deegan et al.

(10) Patent No.: US 7,727,460 B2
(45) Date of Patent: Jun. 1, 2010

(54) PLASMA ARC REACTOR FOR THE PRODUCTION OF FINE POWDERS

(75) Inventors: David Edward Deegan, Cheltenham (GB); Chris David Chapman, Fairford (GB); Timothy Paul Johnson, Northleach (GB)

(73) Assignee: Tetronics Limited (GB)

( * ) Notice: Subject to any disclaimer, the term of this patent is extended or adjusted under 35 U.S.C. 154(b) by 372 days.

(21) Appl. No.: 11/304,633

(22) Filed: Dec. 16, 2005

(65) Prior Publication Data

US 2006/0107789 A1 May 25, 2006

Related U.S. Application Data

(63) Continuation of application No. 10/203,467, filed as application No. PCT/GB01/00553 on Feb. 9, 2001, now Pat. No. 7,022,155.

(30) Foreign Application Priority Data

Feb. 10, 2000 (GB) .................. 0003081.7
Aug. 15, 2000 (GB) .................. 0020106.1

(51) Int. Cl.
*B22F 9/14* (2006.01)
(52) U.S. Cl. .................. 266/137; 219/121.52; 266/202
(58) Field of Classification Search .............. 266/103, 266/137; 219/121.59
See application file for complete search history.

(56) References Cited

U.S. PATENT DOCUMENTS

| | | | |
|---|---|---|---|
| 2,284,551 A | 5/1942 | Alexander | |
| 3,848,202 A * | 11/1974 | Hyne | 372/38.05 |
| 3,989,512 A | 11/1976 | Sayce | |
| 4,112,288 A | 9/1978 | Pieren et al. | |
| 4,194,107 A | 3/1980 | Klasson | |
| 4,238,427 A | 12/1980 | Chisholm | |
| 4,374,075 A | 2/1983 | Yolton et al. | 264/8 |
| 4,610,718 A | 9/1986 | Araya et al. | 264/10 |

(Continued)

FOREIGN PATENT DOCUMENTS

DE 2755213 6/1979

(Continued)

OTHER PUBLICATIONS

Ageorges H. et al: "Synthesis of Aluminum Nitride in Transferred Arc Plasma Furnaces" Plasma Chemistry & Plasma Processing, US, Plenum Press, New York, vol. 13, No. 4, Dec. 13, 1993.

(Continued)

*Primary Examiner*—George Wyszomierski
(74) *Attorney, Agent, or Firm*—Bacon & Thomas, PLLC (57) ABSTRACT

A plasma arc reactor and process for producing a powder from a solid feed material, for example aluminium, is provided. The reactor comprises: (a) a first electrode (5), (b) a second electrode (10) which is adapted to be spaced apart from the first electrode by a distance sufficient to achieve a plasma arc therebetween, (c) means for introducing a plasma gas into the space between the first and second electrodes, (d) means for generating a plasma arc in the space between the first and second electrodes, wherein the first electrode has a channel (7) running therethrough, an outlet of the channel exiting into the space between the first and second electrodes, and wherein means are provided for feeding solid material (20) through the channel to exit therefrom via the outlet into the space between the first and second electrodes.

1 Claim, 6 Drawing Sheets

U.S. PATENT DOCUMENTS

| | | | |
|---|---|---|---|
| 4,638,488 A | 1/1987 | Shimomoto | |
| 4,861,961 A | 8/1989 | Huys | |
| 4,877,937 A | 10/1989 | Muller | |
| 5,062,936 A | 11/1991 | Beaty et al. | 75/336 |
| 5,244,488 A | 9/1993 | Sato et al. | 75/10.19 |
| 5,263,521 A | 11/1993 | Brossard et al. | |
| 5,332,885 A | 7/1994 | Landes | |
| 5,408,066 A | 4/1995 | Trapani et al. | |
| 5,420,391 A | 5/1995 | Delcea | |
| 5,460,701 A | 10/1995 | Parker et al. | 75/10.19 |
| 5,481,080 A | 1/1996 | Lynum et al. | 291/121.48 |
| 5,593,740 A | 1/1997 | Strumban et al. | 427/577 |
| 5,620,616 A * | 4/1997 | Anderson et al. | 219/121.52 |
| 5,935,461 A | 8/1999 | Witherspoon et al. | 219/121.59 |
| 6,063,243 A | 5/2000 | Zetti et al. | |
| 6,146,505 A | 11/2000 | Muraqkami et al. | 204/192.15 |

FOREIGN PATENT DOCUMENTS

| | | |
|---|---|---|
| EP | 0 510 816 A2 | 10/1992 |
| EP | 0615083 A | 9/1994 |
| EP | 0 776 502 | 4/1997 |
| FR | 2 450 548 | 9/1980 |
| GB | 1 010263 | 11/1965 |
| GB | 1 142 793 | 2/1969 |
| GB | 1 164 810 | 9/1969 |
| GB | 1 339 054 | 11/1973 |
| GB | 2 273 027 | 6/1994 |
| JP | 55 046603 B | 4/1980 |
| JP | 58031825 A | 2/1983 |
| JP | 63 147182 A | 6/1988 |
| JP | 3 264601 A | 11/1991 |
| JP | 06080410 | 3/1994 |
| JP | 06272047 | 9/1994 |
| JP | 62 99209 A | 10/1994 |
| JP | 07 300116 A | 11/1995 |
| JP | 1059485 | 8/1996 |
| JP | 872 43756 A | 9/1996 |
| JP | 8243756 | 9/1996 |
| JP | 10216959 A | 8/1998 |
| RU | 2 133 173 C1 | 7/1999 |
| WO | 9415864 A | 7/1994 |
| WO | 99/31296 | 6/1999 |

OTHER PUBLICATIONS

Database WPI Section Ch, Week 197813 Derwent Pub. Ltd., London, GB; AN 1978-23971A XP002170899.

* cited by examiner

THE VARIATION OF SPECIFIC SURFACE AREA OF IDEA NANOMETRIC ALUMINIUM POWDER WITH PARTICLE SIZE

FIG. 5.

WEIGHT PERCENTAGE OF OXIDE VERSUS PARTICLE DIAMETER FOR ALUMINIUM NANOPOWDER

PLASMA ARC REACTOR FOR THE PRODUCTION OF FINE POWDERS

This application is a continuation application of pending U.S. application Ser. No. 10/203,467, filed Nov. 21, 2002, which issued as U.S. Pat. No. 7,022,155 on Apr. 4, 2006 (of which the entire disclosure of pending, prior application is hereby incorporated by reference) which is a 371 PCT/GB01/00553, filed Feb. 9, 2001.

The present invention relates to an apparatus and process for the production of powders. In particular, a plasma arc reactor is provided which may be used in a plasma evaporation process to produce sub-micron or nano-metric (i.e. nano-sized) aluminium powders.

Metal and ceramic powders are used in sintering processes in metallurgy and in catalysis in the chemical industry. The powders may be used in the manufacture of structural components, magnetic films, chemical coatings, oil additives, propellant additives and also in explosives.

The present invention provides a plasma arc reactor for producing a powder from a solid feed material, the reactor comprising:
(a) a first electrode,
(b) a second electrode which is adapted to be spaced apart from the first electrode by a distance sufficient to achieve a plasma arc therebetween,
(c) means for introducing a plasma gas into the space between the first and second electrodes,
(d) means for generating a plasma arc in the space between the first and second electrodes, wherein the first electrode has a channel running therethrough, an outlet of the channel exiting into the space between the first and second electrodes, and wherein means are provided for feeding solid material into and through the channel to exit therefrom via the outlet into the space between the first and second electrodes.

The term electrode as used herein is intended to encompass a plasma torch.

The first electrode is preferably moveable with respect to the second electrode from a first position at which an arc portion thereof contacts with an arc portion of the second electrode to a second position at which said arc portions are spaced apart from each other by a distance sufficient to achieve a plasma arc therebetween. This is advantageous because contacting the first and second electrodes assists in starting the plasma arc. It will be appreciated that by the term arc portion is meant those regions or points on the surfaces of the first and second electrodes between which a plasma arc may be generated.

The first electrode may preferably take the form of a hollow elongate member whose inner surface defines a closed channel (equivalent to a bore or passageway). The elongate member terminates at an arc tip, which, in use, will oppose an arc portion of the second electrode. The outlet of the closed channel is disposed at or adjacent to the arc tip. In this case, the first electrode may be in the form of a hollow rod, cylinder or tube. The first electrode may be formed initially as a hollow object. Alternatively, the first electrode may be formed as a solid object, to subsequently have a bore or passageway formed therein. If the outlet is disposed at the arc tip, then it will be appreciated that the end surface of the elongate member will define both the arc tip of the electrode and the outlet of the closed channel, the first electrode will typically act as the cathode.

The second electrode, which acts a counter electrode, may take any appropriate form to enable a plasma arc to be generated between it and the first electrode. The second electrode may simply have a substantially planar arc portion. For example, the second electrode may be disposed as a planar substrate on the bottom wall of the plasma reactor.

The arc portions of the first and/or second electrodes will generally be formed from carbon, preferably graphite.

The plasma reactor may be provided in the form of a graphite lined vessel or a graphite crucible, in which a portion thereof acts as the second electrode. Accordingly, the second electrode may be integrally formed with the reactor vessel.

In a preferred embodiment, part or all of the interior surface of the plasma arc reaction chamber constitutes the second electrode. The chamber may be a graphite reaction chamber or a graphite lined reaction chamber.

It is also preferable to make the second electrode the anode so that, in use, metal ions are electrostatically repelled from it.

Neither the first electrode nor the second electrode needs to be earthed.

The plasma arc reactor advantageously further comprises cooling means for cooling and condensing solid material which has been vaporised in the plasma arc generated between the first and second electrodes. The cooling means preferably comprises a source of a cooling gas.

The second electrode preferably comprises a graphite vessel having a surface adapted to direct vaporised material downstream to a cooling zone to be cooled, in use, by a cooling gas.

A collection zone may be provided downstream of the cooling zone for collecting a powder of the condensed vaporised material. The collection zone may comprise a filter cloth which separates the powder particulate from the gas stream. The filter cloth is preferably mounted on an earthed cage to prevent electrostatic charge build up. The powder may then be collected from the filter cloth, preferably in a controlled atmosphere zone. The resulting powder product is preferably then sealed, in inert gas, in a container at a pressure above atmospheric pressure.

The channel in the first electrode is advantageously adapted to additionally introduce the plasma gas into the space between the first and second electrodes. Thus, the solid feed material and plasma gas may travel through a common channel and exit the electrode via a common outlet into the space between the first and second electrodes.

The means for generating a plasma arc in the space between the first and second electrodes will generally comprise a DC or AC power source.

If desired, one or more additional electrodes, also having a material feed channel therein, may be used to enable different materials to be co-fed into a single plasma reactor. A common counter electrode may be used or, alternatively, separate counter electrodes may be provided, each opposing an electrode with a channel therein. Common or separate power supplies may be used, although separate power supplies are preferred since this allows different evaporation rates for different materials.

The apparatus according to the present invention may operate without using any water-cooled elements inside the plasma reactor and may also allow replenishment of solid feed material without stopping the reactor. Water cooling may result in thermal shock and material fracture. There may also be undesirable reactions between water vapour and the material being processed.

The apparatus according to the present invention may further comprise means for conveying solid feed material to the first electrode. If the solid feed material is in the form of a wire, then the apparatus preferably comprises a supply of wire. For example, the apparatus may comprise a container or holder for the wire, preferably a coil or reel. Means are also preferably provided for conveying the wire from the supply of wire to the first electrode, where the wire is fed into the channel this may be achieved, for example, by the use of an electric motor.

The present invention also provides a process for producing a powder from a solid feed material, which process comprises:
(i) providing a plasma arc reactor as herein described,
(ii) introducing a plasma gas into the space between the first and second electrodes,
(iii) generating a plasma arc in the space between the first and second electrodes,
(iv) feeding solid material through the channel to exit via the outlet thereof into the plasma arc, whereby the solid feed material is vaporised,
(v) cooling the vaporised material to condense a powder, and
(vi) collecting the powder.

The process according to the present invention may be considered a gas/vapour phase condensation process. In such a process, a plasma is generated to vaporise the solid feed material and material fragmentation occurs in the vapour phase. The vapour is subsequently cooled and transforms to a solid phase particulate.

The solid feed material will generally comprise or consist of a metal, for example aluminium, nickel or tungsten, including alloys that include one or more of these metals. Aluminium and aluminium alloys are preferred. The solid feed material may be provided in any suitable form which allows it to be fed into and through the channel to exit therefrom into the space between the electrodes. For example, the material may be in the form of a wire, fibres and/or a particulate. The solid feed material does not need to be provided in a secondary supporting phase, such as a liquid carrier.

The solid feed material is preferably provided in the form of a continuous wire. This is advantageous because it has been found that providing the solid feed material in the form of a wire assists in delivering the material to the plasma zone and into the plasma core.

The plasma gas will generally comprise or consist of an inert gas, for example helium and/or argon.

The plasma gas is advantageously injected into the channel in the first electrode to exit therefrom into the space between the first and second electrodes. In this case, the plasma gas and solid material preferably exit the first electrode via a common outlet. The plasma gas and solid material may be fed into the channel in the first electrode via a common inlet or, alternatively, via separate inlets. During operation, the plasma gas and solid material will be co-fed into the channel.

The volume flow rate of the plasma gas is preferably monitored to optimise material-to-plasma heat transfer characteristics and to encourage the material to partition towards the vapour phase.

At least some cooling of the vaporised material may be achieved using an inert gas stream, for example argon and/or helium. Alternatively, or in combination with the use of an inert gas, a reactive gas stream may be used. The use of a reactive gas enables oxide and nitride powders to be produced. For example, using air to cool the vaporised material can result in the production of oxide powders, such as aluminium oxide powders. Similarly, using a reactive gas comprising, for example, ammonia can result in the production of nitride powders, such as aluminium nitride powders. The cooling gas may be recycled via water-cooled conditioning chamber.

The surface of the powder may be oxidised using a passivating gas stream. This is particularly advantageous when the material is aluminium or aluminium-based. The passivating gas may comprise an oxygen-containing gas, and a particularly preferred gas comprises from 95 to 99 vol. % of an inert gas, such as helium and/or argon, and from 1 to 5 vol. % of oxygen, more preferably approximately 98 vol. % of the inert gas(es) and approximately 2 vol. % of oxygen. Such a gas mixture has been found to produce particularly good results for aluminium and aluminium-based materials. The passivating gases are preferably premixed to avoid local gas phase enrichment and the possibility of explosions. The (inert) cooling gas may be recycled and subsequently diluted with oxygen at a rate of typically 1 $NM^3$/hour to provide the passivating gas stream. The aluminium acts as a getter for the oxygen and reacts with it with the result that the partial pressure inside the chamber falls. If the pressure in the chamber is monitored, then a subsequent rise in the partial pressure indicates that the surface of the aluminium powder has been substantially fully passivated. The reactivity of some ultra-fine powders presents an operational risk if there is a likely-hood of contact with, for example, water and/or air. The passivation stage renders the powdered material more suitable for transporting.

For aluminium for certain applications, it is preferable that substantially no oxidation occurs in the plasma. It also preferable that cooling of the vaporised material is achieved using an inert gas stream, for example argon and/or helium. Accordingly, the passivation stage preferably occurs only after the powder has been cooled. In a preferred embodiment, the solid feed material, for example aluminium wire, is fed to the core of the plasma where it is vaporised. The metal vapour is then conveyed to a separate quenching region where it is quenched in an inert gas stream and transforms to a solidified powder. This solid powder is then exposed to oxygen under low temperature oxidation conditions so that the oxide grows to a limiting thickness and then self regulates, i.e. the oxide inhibits further oxidation. This oxygen exposure/reaction process occurs away from the plasma core.

The process according to the present invention may be used to produce a powdered material, such as aluminium, substantially all of the particles of which having a diameter of less than 200 nm. Preferably the average particle diameter lies in the range of from 50 to 150 nm, more preferably from 80 to 120 nm, still more preferably from 90 to 110 nm.

Specific surface area analysis has shown that the process according to the present invention may be used to produce a powdered material, such as aluminium, which has a specific surface area typically in the range of from 15 to 40 $m^2g^{-1}$, more typically in the range of from 25 to 30 $m^2g^{-1}$.

It will be appreciated that the processing conditions, such as material and gas feed rates, temperature and pressure, will need to be tailored to the particular material to be processed and the desired size of the particles in the final powder.

Preferably, part or all of the interior surface of the reaction vessel constitutes the second electrode. The second electrode is preferably the anode and the first electrode is preferably the cathode. For certain applications, the first and/or the second electrodes are preferably formed from a material that does not react with the feed material at the temperature involved.

Both the first and second electrodes are preferably formed of a carbon material, more preferably graphite. Accordingly, the reaction vessel may be a graphite reaction chamber or a graphite lined reaction chamber, which constitutes the second electrode.

It is generally preferable to pre-heat the reactor before vaporising the solid feed material. The reactor may be pre-heated to a temperature of up to typically 2500° C., more typically from 500° C. to 2500° C. For an aluminium feed material, the reactor is preferably preheated to a temperature of from 2000° C. to 2500° C., more preferably from 2200° C. to 2500° C., still more preferably from 2300° C. to 2500° C. Pre-heating may be achieved by any suitable means, although it is preferably achieved using the plasma arc. Preferably, substantially all of the interior of the reaction vessel is pre-heated.

The rate at which the solid feed material is fed into the channel in the first electrode will affect the product yield and powder size. When using aluminium wire, a feed rate of from 1 to 5 kg/hour has been used, more typically approximately 2 kg/hour. The aluminium wire is typically 1 to 10 mm gauge, more typically 1 to 5 mm.

The inert plasma gas, for example helium, may also be injected through the channel in the first electrode at a rate of from 2.4 to 6 $Nm^3/h$, more typically approximately 3 $Nm^3$/hour.

If a DC power supply is used to generate the plasma arc, then the DC amperage will generally be set at a value in the range of from 400 to 800 A. Typical DC Electrical characteristics are of the order of 800 A and between 30 to 40 V with a plasma arc column length of between 60 mm and 70 mm.

The process and the plasma arc reactor according to the present invention are typically operated at above atmospheric pressure, more typically in excess of 750 mm of water above atmospheric pressure. This prevents or assists in preventing the ingress of atmospheric oxygen into the plasma zone, which may result in an undesirable chemical reaction. When the feed material is aluminium, it is preferable to operate the plasma arc reactor above atmospheric pressure, typically up to 45 inWG (inches water gauge), more typically from 15 to 35 inWG. Operating at a pressure above atmospheric pressure also has the advantage that it results in a higher yield of particulate material.

If a cooling gas, preferably an inert gas such as argon or helium is used to cool and condense the vaporised material, a flow rate of from 60 to 120 $Nm^3/h$ has been found to result in an aluminium powder in which most, if not substantially all, of the particles have a diameter of less than 200 nm in diameter (more typically $\leq 100$ nm). After cooling, the gas and particulate temperature will typically be from 300 to 350° C.

For an aluminium feed material, the process according to the present invention may be used to produce a powdered material having a composition based on a mixture of aluminium metal and aluminium oxide. This is thought to arise with the oxygen addition made to the material during processing under low temperature oxidation conditions. Accordingly, the present invention also provides a particulate material comprising particles having a core comprising or consisting essentially of aluminium and a surface layer comprising or consisting essentially of aluminium oxide, which particulate material is obtainable by a process as herein described.

Substantially only the surface of the particles oxidise and surface specific analysis has shown that the oxide component of the powder is associated generally with the surface and the oxide layer is typically less than approximately 10 nm in thickness, more typically less than approximately 5 nm in thickness. Hence, such a material can be described as discreetly encapsulated. Substantially all of the particles of the oxide coated aluminium have a diameter of less than 200 nm and the average particle diameter will typically lie in the range of from 50 to 150 nm, more typically from 80 to 120 nm, still more typically from 90 to 110 nm. The specific surface area of the oxide coated aluminium particles will typically be in the range of from 15 to 40 $m^2g^{-1}$, more typically in the range of from 25 to 30 $m^2g^{-1}$.

Examination of the particulate using TEM and electron diffraction indicates that the aluminium particles are essentially single crystal, i.e. mono-crystalline.

The present invention will now be described further, by way of example, with reference to the accompanying drawings in which:

FIGS. 3($a$) and ($b$) are secondary electron micrographs of aluminium powders made by the process according to the present application (magnification: ×100,000 ($a$) and ×200,000 ($b$));

Figure 1:
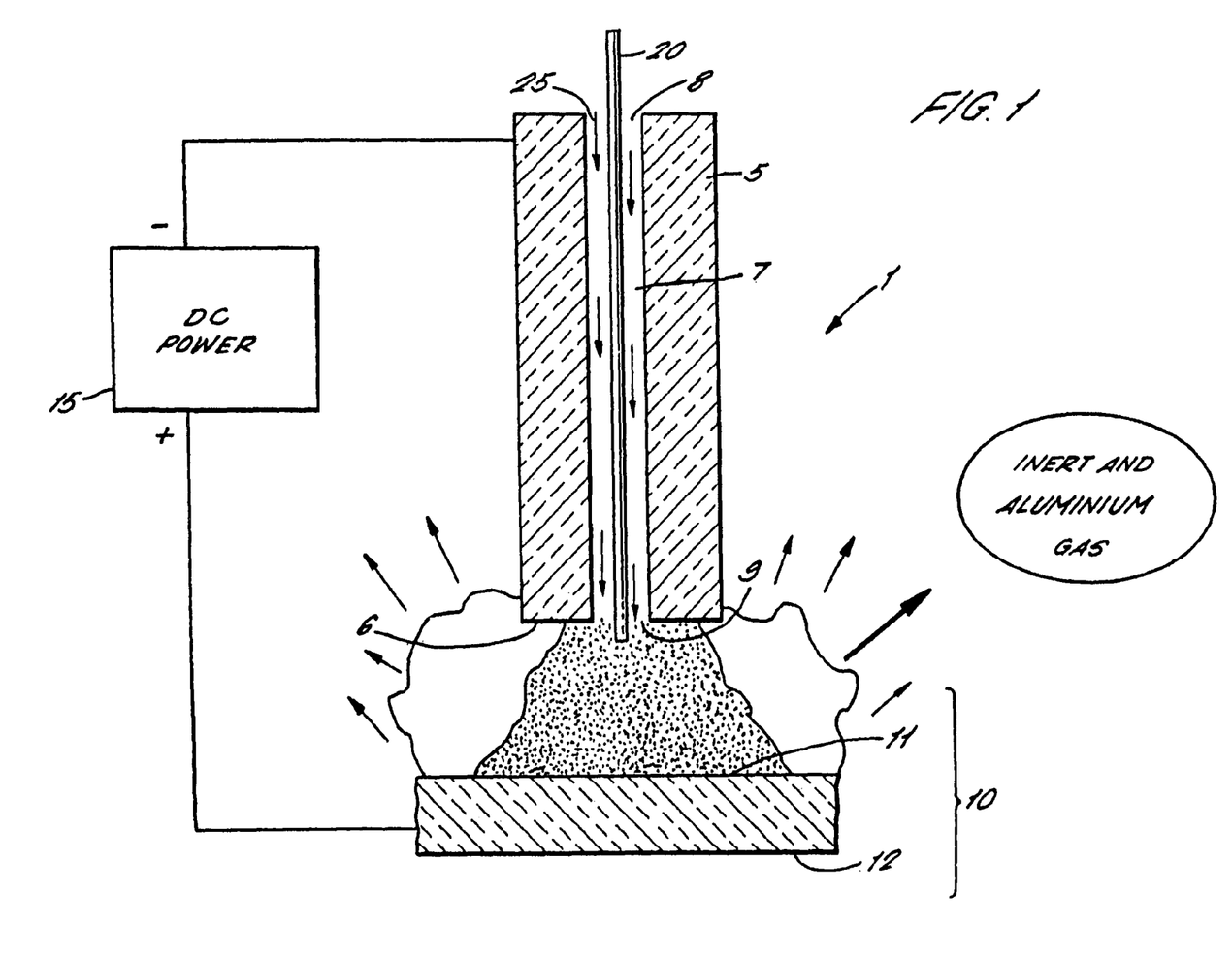
FIG. 1 shows one embodiment of an electrode configuration which may be used in a plasma arc reactor according to the present invention.

In FIG. 1, a first electrode 5 is provided in the form of a cylindrical graphite rod which terminates at an arc tip 6. If desired, the upper portion of the graphite electrode 5 may be replaced with copper. The electrode 5 has a central bore formed therein which extends along the length of the electrode 5. The surface of the bore defines a closed channel 7 (or passageway) having an inlet 8 at one end and an outlet 9 disposed at the arc tip 6.

Figure 2:
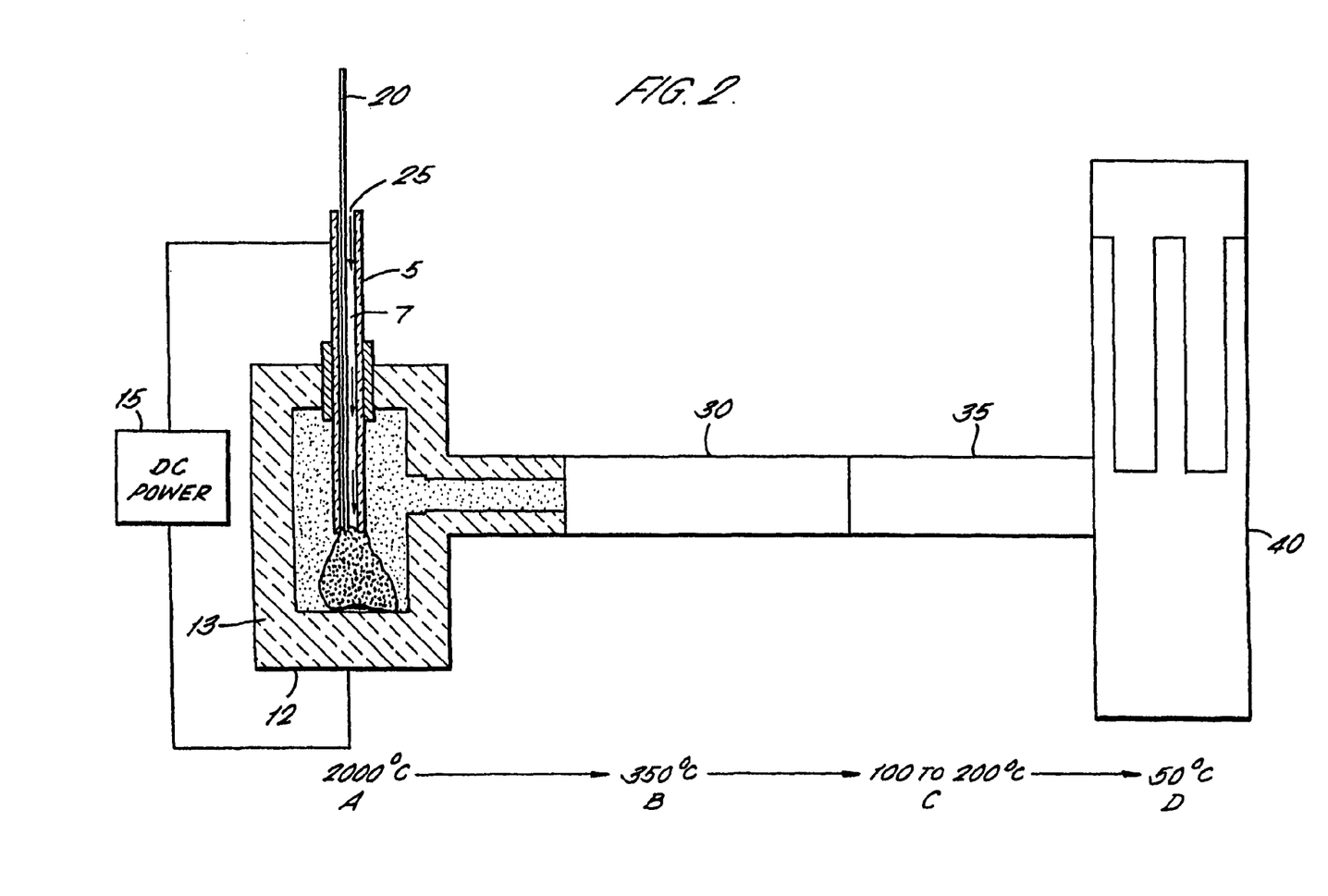
FIG. 2 provides a flow diagram of a process according to the present invention.

A second counter electrode 10 is provided as part of a graphite-lined reactor vessel (13) (see FIGS. 1 and 2). Only an arc portion 11 on the interior surface of the bottom wall 12 of the vessel 13 is shown in FIG. 1. The whole of the vessel 13 is shown in FIG. 2 and it can be seen that the counter electrode forms an integral part of the reactor vessel 13. The arc portion 11 of the second electrode 10 opposes the arc tip 6 of the first electrode 5.

The first 5 and second 10 electrodes are connected to a DC power supply 15. The first electrode 5 is the cathode and the second electrode is the anode 10, although it will be appreciated that the polarities may be reversed.

The first electrode 5 is moveable with respect to the second electrode 10 and hence may be lowered to contact at the arc tip 6 thereof with the arc portion 11 of the second electrode 10 to complete the electrical circuit. The DC amperage from power supply 15 will generally be set at a value from 400 to 800 A. By raising the first electrode 5, a DC plasma arc can be established between the arc tip 6 of the first electrode 5 and the arc portion 11 of the second electrode 10.

A solid feed material, for example aluminium wire 20, can be fed into the inlet 8, to pass down the channel 7, out the outlet 9 and into the space between the arc tip 6 of the first electrode 5 and the arc portion 11 of the second electrode 10. An inert plasma gas 25, such as argon and/or helium, may similarly be injected through the channel 7, via the inlet 8, to exit the first electrode 5 at outlet 9. Accordingly, both the aluminium wire 20 and the plasma gas 25 may enter the first electrode 5 via a common inlet 8 and exit the electrode 5 via a common outlet 9 at the arc tip 6.

The wire 20 may be stored by conventional means on a coil or reel and fed by a multi-speed motor into inlet 8. The plasma gas 25 may be stored by conventional means in a gas tank, and controlled injection into the inlet may be achieved by the use of a valve. Accordingly, the feed rates of both the wire and the plasma gas may be controlled.

In use, the graphite-lined vessel 10 is preheated to a temperature of at least about 2000° C. (typically approximately 2200° C. to 2300° C.) using the plasma arc. This entails injecting an inert plasma gas 25 through channel 7 in the first electrode 5 and switching on the power supply 15.

The reactor is typically operated in excess of 750 mm of water above atmospheric pressure.

Once the reactor has been pre-heated, aluminium wire 20 is then fed into the inlet 8 of channel 7 in the first electrode 5 at a rate of typically 2 kg/hour. Inert plasma gas is also injected through channel 7, typically at a rate of from 2.4 and 6 $Nm^3/h$, more typically approximately 3 $Nm^3$/hour.

Typical DC electrical characteristics are of the order of 800 A and from 30 to 40 V with a plasma arc column length of from 60 mm and 70 mm.

In this manner, the aluminium wire 20 is vaporised in the hot plasma gas (step A in FIG. 2). The wire 20 and plasma gas 25 are continually fed into the channel 7 of the first electrode 7 as the wire 20 is vaporised in the plasma arc. Eventually a steady-state will be achieved. It will be appreciated that the feed rates of the wire 20 and/or gas 25 may be adjusted during processing.

The vaporised aluminium and plasma hot gas exits the reactor vessel under the influence of the gas being injected through the channel 7 in the first electrode 5. The vaporised aluminium is then quenched in a cooling zone 30 using an inert cooling gas stream, such as argon or helium, to condense a sub-micron powder of aluminium (step B in FIG. 2). The flow rate of the cooling gas stream is typically from 60 to 120 $Nm^3/h$, and the particles of the aluminium powder are typically $\leq 200$ nm in diameter (more typically $\leq 100$ nm). After the inert gas quench, the gas and particulate temperature is typically from 300 to 350° C.

If desired, a passivation step may next be carried out in a passivation zone 35 downstream of the cooling zone 30 (step c in FIG. 2). This may be achieved in a number of ways. The cooling gas may be recycled to a water-cooled conditioning chamber for further cooling, and then injected back into the apparatus, together with up to 5 vol. % of oxygen to contact with the powder. Typically, the oxygen is introduced at a rate of approximately 1 $Nm^3$/h. Alternatively, a separate source-of the passivation gas may be used. The temperature during the passivation step is typically in the range of from 100 to 200° C.

After the passivation step, the powder particulate and gas stream pass to a collection zone 40 which contains a filter cloth (not shown) to separate the particulate from the gas (see step D in FIG. 2). The filter cloth is preferably mounted on an earthed cage to prevent electrostatic charge build up. The gas may be recycled.

The powder may then be collected from the filter cloth, preferably in a controlled atmosphere zone. The resulting powder product is preferably then sealed, in inert gas, in a container at a pressure above atmospheric pressure.

If desired, one or more additional electrodes having a channel therein may be used to co-feed different metals into a single plasma vessel to produce, for example, alloy powders, sub-micron and nano-sized mixtures, oxides and nitrides. A common counter electrode may be used or, alternatively, separate counter electrodes may be provided, each opposing an electrode with a channel therein. Common or separate power supplies may be used, although separate power supplies are preferred since this allows for different evaporation rates for different metals.

EXAMPLE

This example relates to the production of an nano-metric aluminium powder using atmospheric DC plasma technology, which is a clean, controllable and directional heat source. Aluminium powders may be used in sintering processes in metallurgy and in catalysis in the chemical industry. The powders may be used in the manufacture of structural components, magnetic films, chemical coatings, oil additives, propellant additives and also in explosives.

The process utilises the mechanism of gas phase condensation. The process offers the advantage of high throughput (Kg/hr) under mixed inert gas process conditions, followed by controllable material passivation during pneumatic conveyance and dispersion above atmospheric pressure. The material is produced, cooled, passivated (i.e. surface oxidised under low temperature conditions), collected and packaged in a highly monitored and automated manner.

The original feed wire (precursor) used in the process is a wrought alloy with the designation 1050A, ASTM=ER1100, DIN=S-AL 9915. This wire has a nominal composition of 99.5 wt % Al, the main impurities are Si and Fe at a maximum of 0.25 wt % and 0.40 wt % respectively.

The aluminium and aluminium oxide content cannot be determined directly, so a quantitative elemental analysis of major powder components was undertaken. The calculation assumed all oxygen was combined as aluminium oxide, having the stochiometry $Al_2O_3$. A pre-calibrated Leco TC436 oxygen and nitrogen analyser was used to determine oxygen content. A pre-calibrated Leco CS344 carbon and sulphur analyser was used for carbon analysis. Energy dispersive X-ray fluorescence spectroscopy (EDXRF) was used to check powder for high levels of contamination. An ARL 3410 inductively coupled plasma atomic emission spectrometer (ICPAES) was used to quantitatively analyse the solutions for high level of contaminant identified by EDXRF.

The EDXRF analysis showed significant levels of calcium, although other contaminants were found at very low levels, for example Fe, Na, Zn and Ga. Hence the quantitative analysis focussed on O, C and Ca. The Al content can be assumed to make up the majority of the remaining powder after subtraction of the alumina, calcium and carbon content. The carbon content was assumed as elemental due to the insoluble residue left in the container during ICPAES analysis. The analysis results are shown in Table 1

TABLE 1

Combined Material Analysis Results

| Specimen ID | C wt % | Ca wt % | O* wt % | Calculated wt % $Al_2O_3$ | Calculated wt % Al |
|---|---|---|---|---|---|
| 6AL | 2.48 | 0.17 | 14.9 | | |
| 6AL | 2.41 | 0.17 | 15.4 | | |
| 6AL | | | 16.3 | | |
| Mean | 2.44 | 0.17 | 15.5 | 33 | 64.4 |

*Oxygen is purposely added to the system under low temperature oxidation conditions Aluminium powder samples have been examined by scanning electron microscopy (SEM) using a Leica Cambridge S360 instrument. Electron micro-graphs were prepared to show the size and shape of the particles. Quantitative energy dispersive (ED) X-ray analysis was carried out to determine the elements present in the sample using a PGT IMIX X-ray analysis system attached to the SEM.

Figure 3:
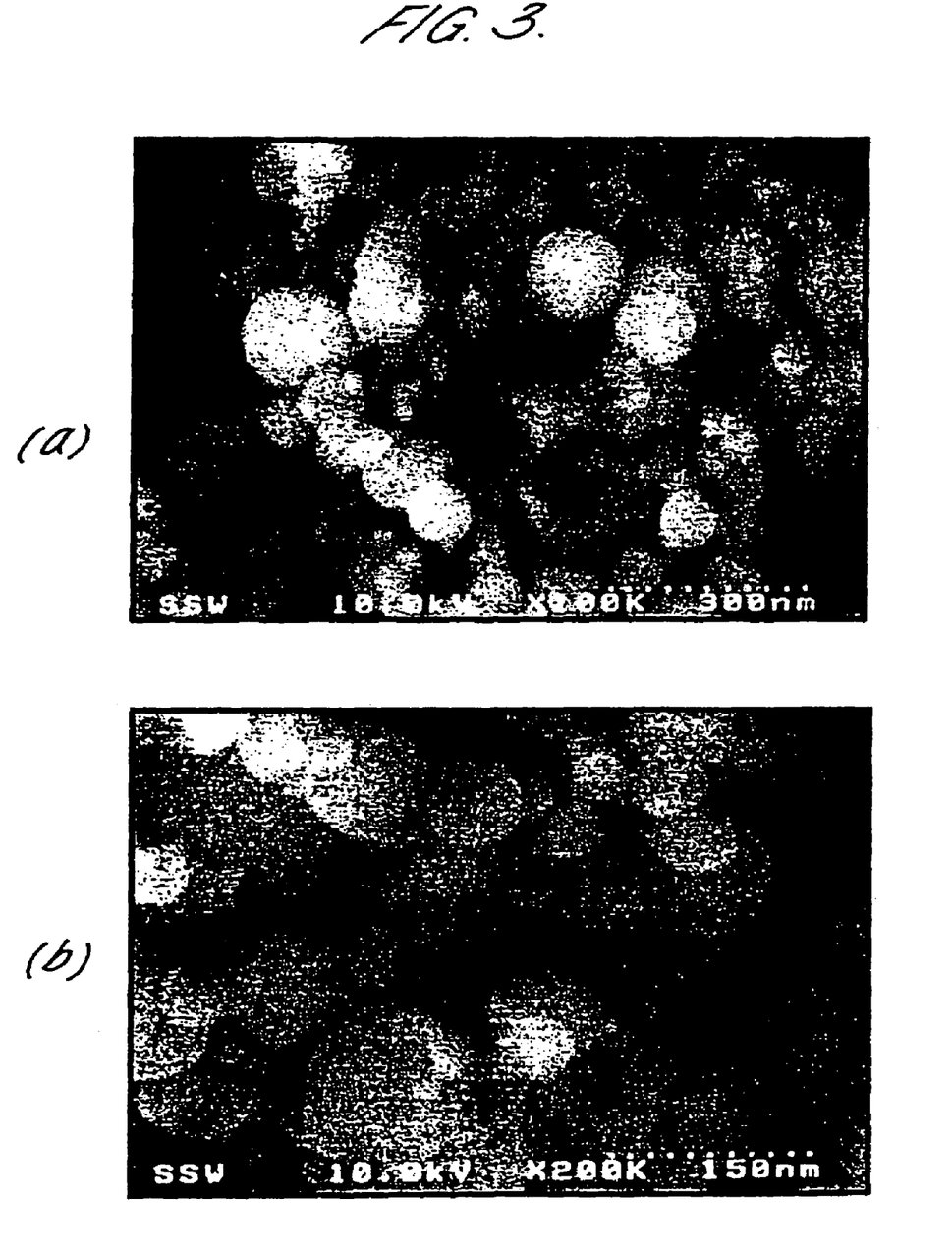

Secondary electron detection was used to give topographic textured images of the aluminium powder particulate and associated agglomerates. At low magnification (×350 magnification) the powder product was observed to have agglomerated. The size of the agglomerates ranged from less than 5 μm to more than 200 μm. At higher magnification (×20,000 and 50,000 magnification) the individual particles could be imaged. Their size (i.e. largest dimension) was observed to be approximately 100 nm±50 nm, however the particles still appeared to be clumped together. These agglomerates were determined to be made up of these finer particles. The shape of the particles seemed to be irregular either spherical or oval. The shape of the individual particles and the process of agglomeration are thought to occur to minimise the excess surface free energy associated with such a finely divided material. Two secondary electron micrographs are shown in FIGS. 3(a) and (b).

Transmission electron microscopy (TEM) has shown that the particles typically have a generally spherical morphology. Corresponding electron diffraction work indicates that the particles are typically essentially mono-crystalline.

Figure 4:
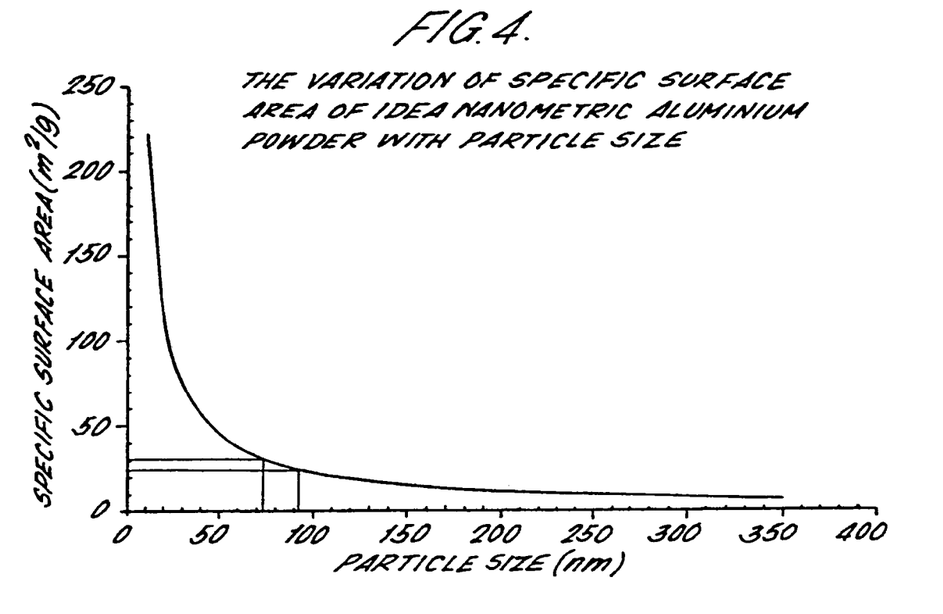
FIG. 4 is a graph showing the variation of specific surface area of an ideal nanometric aluminium powder with particle diameter.

The specific surface area (SSA) was determined by nitrogen absorption, using the continuous flow method, described in BS-4359 Part 1. The SSA was shown to lie in the range of from 25 to 30 m$^2$g$^1$. FIG. 4 shows the variation of specific surface area with particle size for an ideal chemically pure, spherical aluminium powder. FIG. 4 indicates that a mean particle size of 90 nm is consistent with a specific surface area of from 25 to 30 m$^2$g$^{-1}$. So the SEM images show consistency with the SSA analysis.

Figure 5:
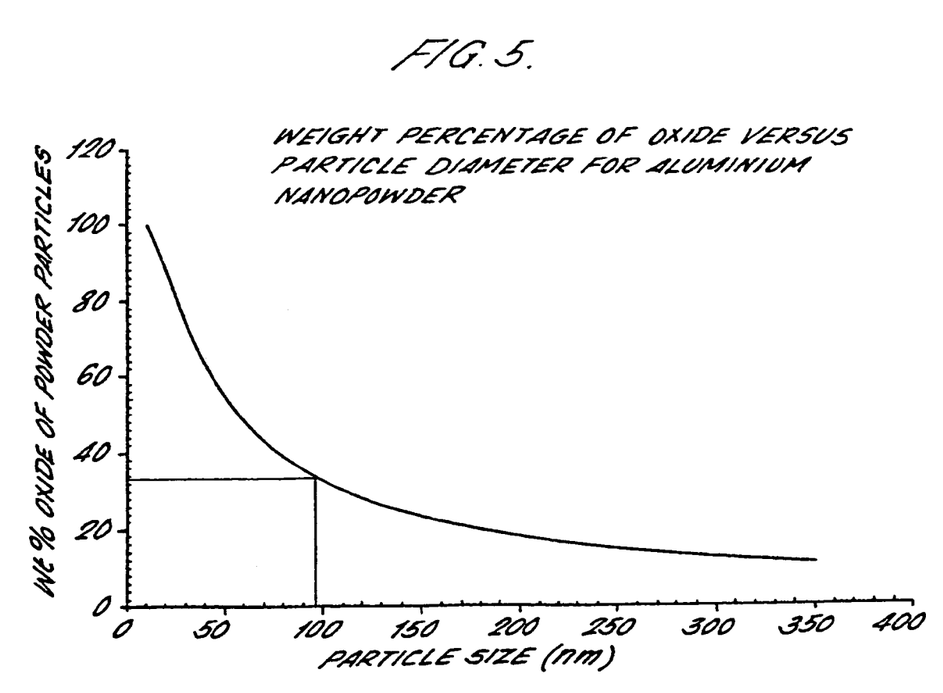
FIG. 5 is a graph showing the variation of oxide content of an ideal nanometric aluminium powder with particle diameter.

The fraction of oxide in the powder will shift unfavourably as the powder particulate size becomes smaller, i.e. the proportion of oxide will increase relative to that of the metal. This trend is graphically represented in FIG. 5, here a uniform oxide layer of 4.5 nm thickness is assumed. This represents the diffusion limited adherent, coherent and uniform oxide film associated with aluminium material exposed to an oxygen rich atmosphere under low temperature conditions.

Again the compositional analysis indicated an oxide content of 33 wt %, this gives rise to an implied particle size of from 90 to 100 nm. This again being consistent with the SSA analysis and SEM images.

Figure 6:
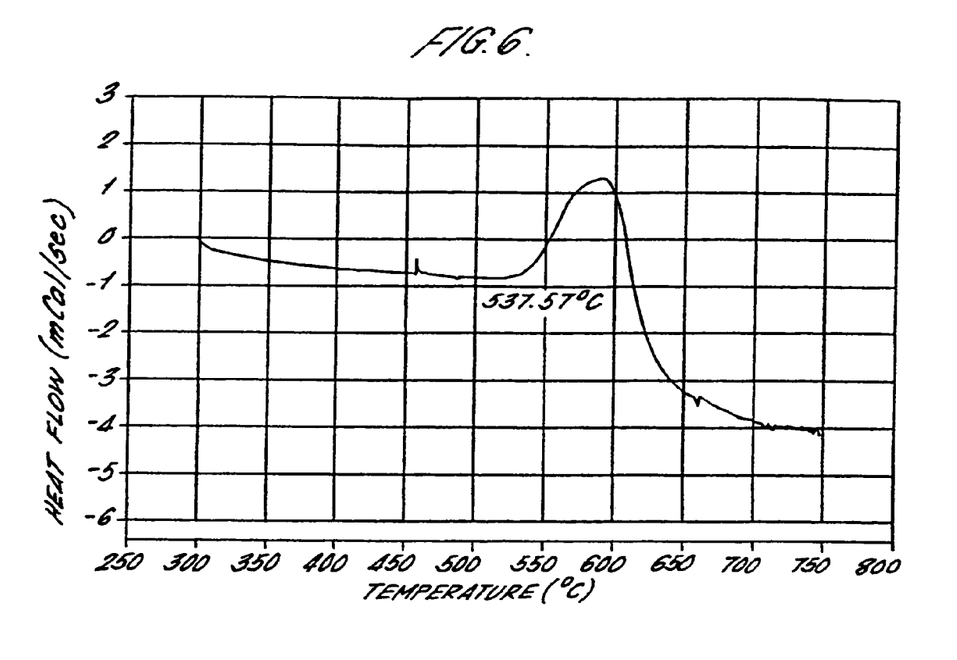
FIG. 6 is a graph showing primary ($1^{st}$ heat) DSC analysis for an aluminium sample.
Figure 7:
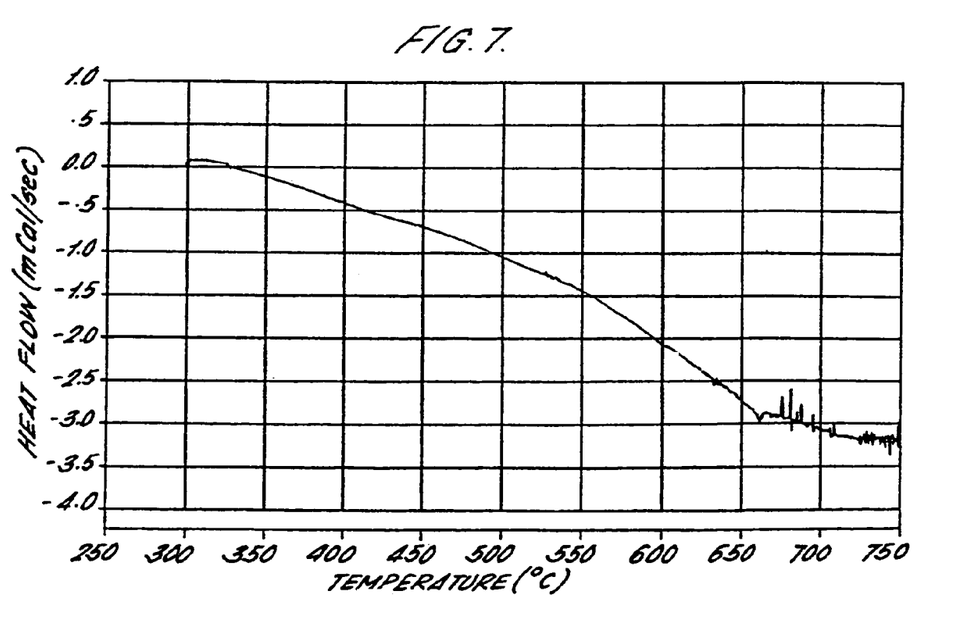
FIG. 7 is a graph showing secondary ($2^{nd}$ heat) DSC analysis for an aluminium sample.

Thermal analysis was carried out using a Differential Scanning Calorimetry (DSC). The instrument was initially checked for temperature and energy calibration using a traceable indium standard. The sample was heated to 750° C. at a heating rate of 10° C. min$^{-1}$ under air flowing at 5 ml min$^{-1}$. The DSC spectrum shows an exothermic (energy is released) peak with an extrapolated onset temperature of 538° C. The peak range is from 538 to 620° C., with the peak maximum at 590° C. After initial heating the sample was cooled and reheated under the same conditions and no exotherm was observed. This indicated a complete and irreversible chemical reaction, i.e. oxidation of aluminium. This is graphically represented in the FIGS. 6 and 7.

The technique of X-ray Photoelectron Spectroscopy (XPS) is surface sensitive and the outermost 2 to 3 layers of a material (i.e. the top 1 nm) is typically analysed. This gives both compositional and chemical information. For example, XPS can distinguish between Al as a bulk metal and Al associated with an oxide Al$_2$O$_3$. The survey spectrum showed the presence of the following species, Table 2:

TABLE 2

| Peak | Component | Assignment |
| --- | --- | --- |
| 284.7 | C1s | Environmental Carbon Contamination |
| 72.2 | Al2p | Metal |
| 74.2 | Al2p | Al$_2$O$_3$ |
| 531.6 | O1s | Al$_2$O$_3$ |
| 1071.5 | Na1s | Na$_2$CO$_3$ |
| 2061.3 | Na Auger Parameter | Na$_2$CO$_3$ |
| 289.4 | C1s | Na$_2$CO$_3$ |

Figure 8:
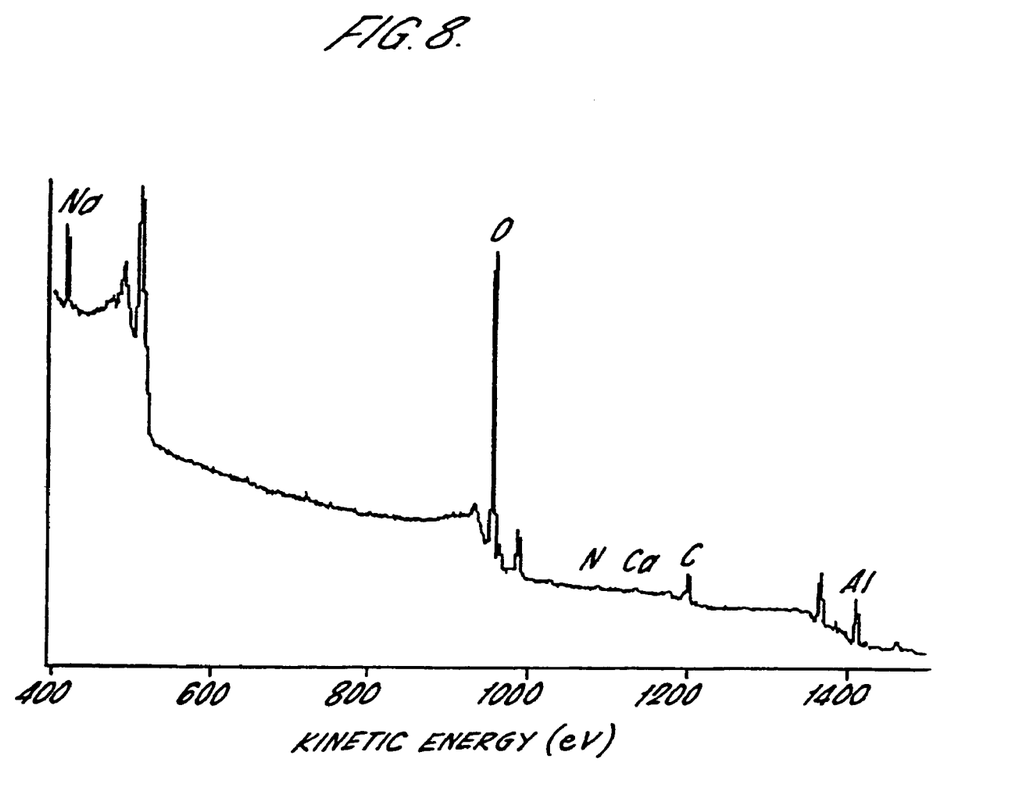
FIG. 8 is a survey spectrum of nanometric Al powder analysed by XPS.

The survey spectrum is provided in FIG. 8 and shows the presence of carbon (19 atomic %), oxygen (50 atomic %), aluminium (27 atomic %), nitrogen (0.6 atomic %), sodium (3.3 atomic %) and calcium (0.7 atomic %). These values were calculated using published sensitivity factors (Briggs and Seah 1990). Detailed spectra were taken off the main peak to provide chemical information in the form of binding energies, we did not take into account factors such as morphology, topography and heterogeneity. The carbon peak was used to calibrate the spectrum, i.e. adventitious carbon contamination (environmental contamination), binding energy 287.4 eV. The compositional information relates to the outer 2 to 3 layers of the particulate material and, accordingly, should not be interpreted as the overall bulk composition of the material.

Al2p peak showed two superimposed components due to the metal and the native oxide with binding energies of 72.1 eV and 74.1 eV respectively. The fact that the aluminium metal associated with the interior of the particulate could be detected, i.e. the substrate metal, through the oxide indicates a thin overlayer of less than 2 to 3 monon-layers (Crystallography: Corundum has a rhombohedral crystal system where a=b=c=12.98 Å). The carbon peak was observed to be made up of two components, i.e. environmental contamination and carbide. The carbon could not be categorically associated with any one of the metal species detected. The sodium is probably present as carbonate (Na$_2$CO$_3$).

It is possible to estimate the thickness of the monolayer using the De Beers—Lambert equations and associated assumptions.

De Beers—Lambert Equation, Version 1

$$I^{ox}=I_o^{ox}[1\ \exp(-d/\lambda \sin \theta)] \qquad (1)$$

De Beers—Lambert Equation, Version 2

$$I^{element}=I_o^{element}[\exp(-d/\lambda \sin \theta)] \qquad (2)$$

where $\lambda$ is the inelastic electron mean free path $\lambda=0.05$ (KE)$^{0.5}$ nm$=0.05(1486.6-73)^{0.5}=1.8799$ nm (KE=ejected electron kinetic energy)

If the oxide is native to the metallic material element then $I_o$ and $\lambda$ are approximately the same. Hence, by dividing equation 1 by equation 2, an equation relating the relative Al signal intensities to oxide layer thickness may be obtained:

$$I^{ox}/I^{element}=\exp(d/\lambda \sin \theta)-1 \qquad (3)$$

The assumptions associated with the use of this equation are as follows:

(i) the surfaces are flat;
(ii) the oxide layer is uniform in thickness;
(iii) the layer is continuous; and
(iv) the surfaces are planar.

The outcome of this calculation is that the oxide layer is approximately 2 to 3 nm in thickness, which is consistent with the compositional analysis, SSA analysis and SEM images. The variability being associated with the inaccuracy of the assumptions made in calculation. This calculation is very inaccurate, however the technique will only analyse the uppermost nm of sample as a maximum depth. This means that as a parent metal signal is observed in the survey spectrum, the oxide thickness must be less than 5 nm, this being a definite statement associated with the nature of the characterising radiation.

The particulate material according to the present invention has the following characteristics:

1. In composition the material is observed to be a mixture of aluminium metal and aluminium oxide, which is consistent with the oxygen addition made to the material during processing under low temperature oxidation conditions, i.e. substantially only the surface oxidises.
2. Imaging indicates that the material is formed with a fine spherical particulate morphology of from 70 to 130 nm in average particle diameter, (more typically from 80 to 120 nm, still more typically approximately 100 nm). This justifies the classification as a nanomaterial.
3. The particles are agglomerated by which is meant an assembly of particles held together by weak forces that can be overcome by suitable means, for example sonication.
4. Specific surface area analysis has shown that the material has a specific surface area typically in the range of from 15 to 40 $m^2g^{-1}$, more typically in the range of from 25 to 30 $m^2g^{-1}$. This correlates typically to a particle size of from 75 to 95 nm.
5. Thermal analysis-has shown complete and irreversible chemical reaction takes place in air at 550 to 650° C. This being consistent with thermally driven oxidation.
6. Surface specific analysis has shown that the oxide component of the powder is associated with the surface and the layer is less than approximately 5 nm in thickness. Hence the material can be described as discreetly encapsulated.

The apparatus and process according to the present invention provide a simplified technique for the production and collection of sub-micron and nano-metric powders. In a preferred embodiment, a transferred plasma arc is established between the arc tip of an elongate graphite electrode and a counter electrode formed as part of a graphite reactor crucible.

The apparatus according to the present invention may operate without using any water-cooled elements inside the plasma reactor and allows replenishment of feed material without stopping the reactor.

The reactivity of sub-micron and nano-metric metals, such as aluminium, presents an operational risk if there is a likelyhood of contact with water, reactive liquids, or reactive gases such as air and oxygen. The passivation stage described herein renders the powdered material more suitable for transporting.

The invention claimed is:

1. A plasma arc reactor for producing a powder from a solid feed material, the reactor comprising:
    (a) a first electrode,
    (b) a second electrode,
    (c) a third electrode which is adapted to be spaced apart from the first and second electrodes by a distance sufficient to achieve a plasma arc therebetween,
    (d) means for introducing a plasma gas into the space between the first, second and third electrodes,
    (e) means for generating a plasma arc in the space between the first, second and third electrodes,
    wherein the first and second electrode each have a channel running therethrough, an outlet of the channel exiting into the space between the first, second and third electrodes, and wherein means are provided for feeding solid feed material through the channels to exit therefrom via the outlets into the space between the first, second and third electrodes.

* * * * *